R. L. BOWER.
FOLDING DOUGH BOARD AND BISCUIT CUTTER.
APPLICATION FILED OCT. 20, 1915.
1,228,288.
Patented May 29, 1917.
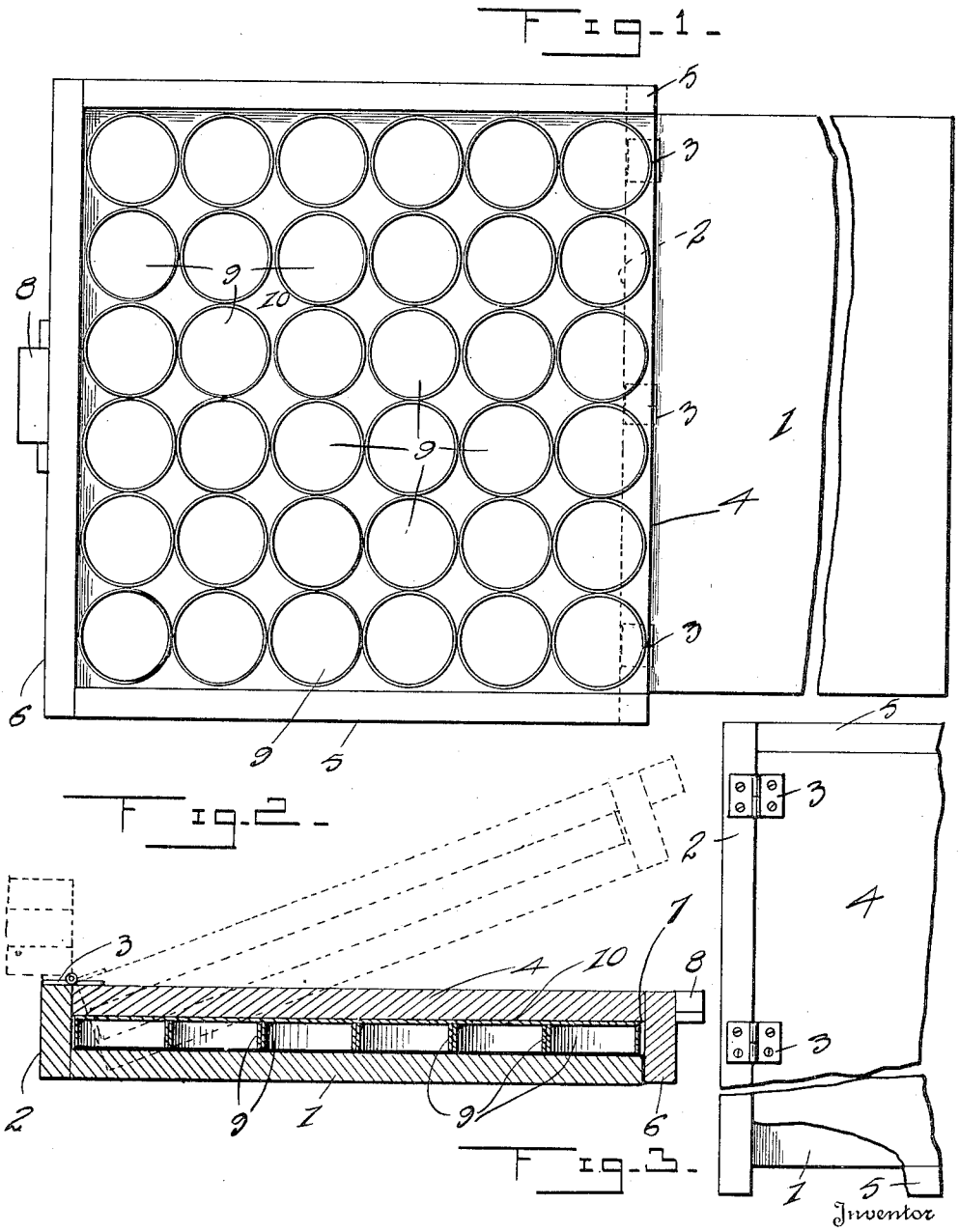

UNITED STATES PATENT OFFICE.

ROBERT L. BOWER, OF MULLENS, WEST VIRGINIA.

FOLDING DOUGH-BOARD AND BISCUIT-CUTTER.

1,228,288.  Specification of Letters Patent.  Patented May 29, 1917.

Application filed October 20, 1915. Serial No. 56,951.

*To all whom it may concern:*

Be it known that I, ROBERT L. BOWER, a citizen of the United States, residing at Mullens, in the county of Wyoming and State of West Virginia, have invented certain new and useful Improvements in Folding Dough-Boards and Biscuit-Cutters; and I do hereby declare the following to be a full, clear, and exact description of the invention, such as will enable others skilled in the art to which it appertains to make and use the same.

The invention relates to a folding dough board and biscuit cutter.

The object of the present invention is to improve the construction of dough boards and biscuit cutters and to provide a simple, practical, and inexpensive folding dough board and biscuit cutter of strong and durable construction adapted when closed to exclude flies and afford a perfectly sanitary device and capable when open of enabling dough upon the entire surface of the board to be cut into biscuits by a single operation of the device.

With these and other objects in view the invention consists in the construction and novel combination and arrangement of parts hereinafter fully described, illustrated in the accompanying drawings and pointed out in the claim hereto appended, it being understood that various changes in the form, proportion and minor details of construction may be resorted to without departing from the spirit or sacrificing any of the advantages of the invention.

In the drawing

Figure 1 is a plan view of a folding dough board and biscuit cutter constructed in accordance with this invention and shown open, Fig. 2 is a vertical sectional view of the same, the device being closed, Fig. 3 is a plan view of the rear portion of the folding dough board and biscuit cutter, the parts being arranged as shown in Fig. 2.

Like numerals of reference designate corresponding parts in all the figures of the drawings.

In the accompanying drawing in which is illustrated the preferred embodiment of the invention, 1 designates a rectangular dough board adapted to be arranged upon a table or other support but it may be equipped with legs if desired and constitute a separate article of furniture. The dough board is provided at the back with a hinged supporting strip 2 extending above the upper face of the dough board and constituting a rear wall and carrying hinges 3 which connect a cover or lid 4 to the dough board. The cover or lid 4 is provided at its side edges and at the front with strips 5 and 6 similar to the strip 2 and when the lid or cover is closed its rear edge fits against the inner or front face of the rear strip 2 and the side and front strips 5 and 6 fit around the side and front edges of the dough board thereby entirely closing the same and excluding flies and other insects from an intervening space 7 between the lid or cover and the dough board 1.

The lid or cover 4 which is provided at the front with a suitable handle 8 carries a plurality of biscuit cutters 9 preferably consisting of cylindrical cups rigidly secured to a sheet 10 of tin or other suitable material attached to and covering the inner face of the lid or cover 4. The covering of the cover or lid 4 permits the cups 9 to be secured thereto in a simple and reliable manner and also provides a sanitary cover which may be easily cleaned and thereby prevent the dough from clinging or otherwise sticking to the cover and becoming sour. The handle 8 which may be of any desired construction is secured directly to the exterior of the front strip 6 but it may be connected with the lid or cover at any other desired point as will be readily understood. When the lid or cover is swung to its open position as shown in Fig. 1, the dough board is exposed and after the dough has been kneaded and spread over the dough board in a sheet the entire sheet may be cut into biscuits by the cutters of the lid or cover which is swung forwardly as illustrated in dotted lines in Fig. 2 of the drawing.

The folding dough board and biscuit cutter may be made of any desired size and of any suitable material; it presents a strong and durable construction which is not liable to be easily broken and when it is folded and by virtue of its front strip 6, rear 2 and side strips 5 it excludes flies and other insects from its interior and also prevents the flour or other material from sifting from the surface of the board 1 during the cutting operation and presents a perfectly sanitary structure. Also the cover 4 by abutting against the front face of the rear strip 2 and the abutment of the front strip 6 against the front edge of the dough board 1 limits the closing movement of the cover so that there is no liability of the cutters being crushed by too great a pressure when the lid is closed. The side and front strips extend to the lower face of the dough board so that the necessary pressure may be applied to the cover for operating the cutters without subjecting the latter to the pressure as the said strips will engage with the supporting surface upon which the dough board is placed and prevent injury to the cutters.

Instead of equipping the lid or cover with cylindrical cutters for cutting biscuits the lid or cover may be provided with cutters of any desired form for cutting dough into fancy cakes and the like.

What is claimed is:—

A folding dough board and biscuit cutter comprising a dough board provided at the back with a strip, a lid hinged at its rear edge to the said strip and arranged to abut against the front face thereof when in closed position, said lid provided with front and side strips depending therefrom and extending below the upper surface and engaging the side and front edges of the dough board to form a casing about said board to exclude flies and other insects, a lining secured to and covering the inner surface of said lid, and a plurality of cutters secured to said lining of the lid, as and for the purpose specified.

In testimony whereof I affix my signature in presence of two witnesses.

ROBERT L. BOWER.

Witnesses:
GROVER C. WORRELL,
CHARLES B. LEECH.

Copies of this patent may be obtained for five cents each, by addressing the "Commissioner of Patents, Washington, D. C."